United States Patent [19]

Oka

[11] Patent Number: 4,975,962
[45] Date of Patent: Dec. 4, 1990

[54] PHONEME LABELLING OF FRAME BY ACCUMULATING EVIDENCE OBTAINED FROM SPOTTING RESULTS OF MICROSCOPIC UNITS

[75] Inventor: Ryuichi Oka, Ibaraki, Japan

[73] Assignee: Agency of Industrial Science and Technology, Tokyo, Japan

[21] Appl. No.: 27,447

[22] Filed: Mar. 18, 1987

[30] Foreign Application Priority Data

Mar. 22, 1986 [JP] Japan .................................. 61-64512

[51] Int. Cl.$^5$ ................................................ G10L 7/08
[52] U.S. Cl. ...................................................... 381/43
[58] Field of Search .................................... 381/41–45, 381/46; 364/513.5

[56] References Cited

U.S. PATENT DOCUMENTS

| | | | |
|---|---|---|---|
| 4,059,725 | 11/1977 | Sakoe | 381/43 |
| 4,567,606 | 1/1986 | Vensko et al. | 381/43 |
| 4,592,085 | 5/1986 | Watari et al. | 381/43 |
| 4,723,290 | 2/1988 | Watanabe et al. | 381/43 |
| 4,802,226 | 1/1989 | Watanabe | 381/43 |

FOREIGN PATENT DOCUMENTS

| | | |
|---|---|---|
| 0146434 | 6/1985 | European Pat. Off. |
| 2087617A | 5/1982 | United Kingdom . |
| 2107102A | 4/1983 | United Kingdom . |
| 2109971A | 6/1983 | United Kingdom . |
| 2159996A | 12/1985 | United Kingdom . |

OTHER PUBLICATIONS

Satoru Hayamizu, Ryu-ichi Oka, "Experimental Studies on the Connected-Words Recognition Using Continuous Dynamic Programming", Systems, Computers, Controls, vol. 15, No. 4, 1984, pp. 80–88.

Ryu-ichi Oka, "Continuous Speech Recognition on the Bases of Vector Field Model for Segmentationa dn Feature Extraction and Continuous Dynamic Programming for Pattern Matching", IEEE International Conference, Mar. 26–29, 1985, pp. 1221–1224.

Richard W. Christiansen, Craig K. Rushforth, "Detecting and Locating Key Words in Continuous Speech Using Linear Predictive Coding", IEEE Transactions on Acoustics, Speech & Signal Processing, ASSP-25, No. 5, Oct. 1977, pp. 361–367.

Primary Examiner—Gary V. Harkcom
Assistant Examiner—John A. Merecki
Attorney, Agent, or Firm—Spencer & Frank

[57] ABSTRACT

Comparatively macroscopic phonemic units consisting of continuous sounds are used as standard patterns in continuous dynamic programming. In matching intervals between these standard patterns and input patterns, a sampled pattern is labeled according to the phonemes and phonemic particles which form the standard patterns. In the matching intervals, the labeled pattern is called a matching history. The matching history of a standard pattern when the continuous dynamic programming value is below a certain threshold value is used to recognize the phonemes of the input patterns.

8 Claims, 13 Drawing Sheets

| Band No. Hz / t | 1<br>0–156 | 2<br>156–252 | 3<br>252–356 | 4<br>356–469 | 5<br>469–591 | 6<br>591–723 | 7<br>723–866 | 8<br>866–1020 | 9<br>1020–1188 | 10<br>1188–1370 | 11<br>1370–1560 | 12<br>1560–1779 | 13<br>1779–2010 | 14<br>2010–2260 | 15<br>2260–2530 | 16<br>2530–2823 | 17<br>2823–3141 | 18<br>3141–3484 | 19<br>3484–3856 | 20<br>3856–4259 |
|---|---|---|---|---|---|---|---|---|---|---|---|---|---|---|---|---|---|---|---|---|
| 1 | 11 | 15 | 20 | 33 | 48 | 29 | 41 | 17 | 34 | 46 | 72 | 30 | 13 | 57 | 62 | 83 | 40 | 21 | 18 | 92 |
| 2 | 18 | 20 | 25 | 15 | 8 | 10 | 30 | 50 | 60 | 15 | 8 | 50 | 60 | 50 | 18 | 20 | 21 | 15 | 8 | 20 |
| 3 | 19 | 21 | 25 | 16 | 8 | 10 | 31 | 48 | 58 | 17 | 10 | 48 | 58 | 52 | 20 | 18 | 19 | 13 | 6 | 22 |
| 4 | 20 | 18 | 50 | 30 | 31 | 25 | 18 | 8 | 20 | 6 | 25 | 7 | 8 | 20 | 60 | 58 | 25 | 35 | 15 | 33 |

PRIOR ART

FIG. 1

| Band No. \ τ | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|
| Hz | 0-156 | 156-252 | 252-356 | 356-469 | 469-591 | 591-723 | 723-866 | 866-1020 | 1020-1188 | 1188-1370 | 1370-1560 | 1560-1779 | 1779-2010 | 2010-2260 | 2260-2530 | 2530-2823 | 2823-3141 | 3141-3484 | 3484-3856 | 3856-4259 |
| 1 (τ₁) | 11 | 15 | 20 | 33 | 48 | 29 | 41 | 17 | 34 | 46 | 72 | 30 | 13 | 57 | 62 | 83 | 40 | 21 | 18 | 92 |
| 2 (τ₁) | 11 | 15 | 20 | 33 | 48 | 29 | 41 | 17 | 34 | 46 | 72 | 30 | 13 | 57 | 62 | 83 | 40 | 21 | 18 | 92 |
| 3 (τ₁) | 11 | 15 | 20 | 33 | 48 | 29 | 41 | 17 | 34 | 46 | 72 | 30 | 13 | 57 | 62 | 83 | 40 | 21 | 18 | 92 |
| 4 (τ₁) | 11 | 15 | 20 | 33 | 48 | 29 | 41 | 17 | 34 | 46 | 72 | 30 | 13 | 57 | 62 | 83 | 40 | 21 | 18 | 92 |
| 5 (τ₁) | 13 | 16 | 21 | 30 | 15 | 20 | 36 | 20 | 40 | 25 | 55 | 35 | 25 | 56 | 48 | 71 | 33 | 19 | 16 | 70 |
| 6 (τ₁) | 14 | 18 | 23 | 26 | 10 | 16 | 33 | 35 | 50 | 18 | 40 | 40 | 38 | 55 | 36 | 50 | 29 | 17 | 13 | 62 |
| 7 (τ₁) | 16 | 19 | 24 | 18 | 8 | 10 | 30 | 40 | 55 | 16 | 15 | 45 | 52 | 52 | 24 | 32 | 24 | 16 | 9 | 43 |
| 8 (τ₁) | 18 | 20 | 25 | 15 | 8 | 10 | 30 | 50 | 60 | 15 | 8 | 50 | 60 | 50 | 18 | 20 | 21 | 15 | 8 | 20 |
| ... | ∼ | ∼ | ∼ | ∼ | ∼ | ∼ | ∼ | ∼ | ∼ | ∼ | ∼ | ∼ | ∼ | ∼ | ∼ | ∼ | ∼ | ∼ | ∼ | ∼ |
| 13 (τ₂) | 18 | 20 | 25 | 15 | 8 | 10 | 30 | 50 | 60 | 15 | 8 | 50 | 60 | 50 | 18 | 20 | 21 | 15 | 8 | 20 |
| 14 (τ₂) | 19 | 19 | 30 | 18 | 15 | 16 | 22 | 40 | 48 | 10 | 19 | 40 | 48 | 33 | 25 | 38 | 21 | 21 | 10 | 21 |
| 15 (τ₂) | 19 | 19 | 43 | 23 | 17 | 18 | 20 | 31 | 30 | 8 | 21 | 25 | 26 | 21 | 47 | 42 | 22 | 28 | 15 | 22 |
| 16 (τ₃) | 19 | 19 | 48 | 27 | 28 | 23 | 20 | 19 | 25 | 7 | 23 | 16 | 15 | 20 | 58 | 49 | 23 | 30 | 15 | 22 |
| 17 (τ₃) | 20 | 18 | 50 | 30 | 31 | 25 | 18 | 8 | 20 | 6 | 25 | 7 | 8 | 20 | 60 | 58 | 25 | 35 | 15 | 23 |
| 18 (τ₃) | 20 | 18 | 50 | 30 | 31 | 25 | 18 | 8 | 20 | 6 | 25 | 7 | 8 | 20 | 60 | 58 | 25 | 35 | 15 | 23 |
| 19 (τ₃) | 20 | 18 | 50 | 30 | 31 | 25 | 18 | 8 | 20 | 6 | 25 | 7 | 8 | 20 | 60 | 58 | 25 | 35 | 15 | 23 |
| 20 (τ₃) | 20 | 18 | 50 | 30 | 31 | 25 | 18 | 8 | 20 | 6 | 25 | 7 | 8 | 20 | 60 | 58 | 25 | 35 | 15 | 23 |

FIG. 2  PRIOR ART

A, B, C : Phonemic Label (Microscopic Category)
C⊕B⊕A : Standard Feature For CDP Matching
        (Macroscopic Category)
h : Threshold Value For CDP Value

| Bond No. | 1 | 2 | 3 | 4 | 5 | 6 | 7 | 8 | 9 | 10 | 11 | 12 | 13 | 14 | 15 | 16 | 17 | 18 | 19 | 20 | Label | |
|---|---|---|---|---|---|---|---|---|---|---|---|---|---|---|---|---|---|---|---|---|---|---|
| Hz | 0-156 | 156-252 | 252-356 | 356-469 | 469-591 | 591-723 | 723-866 | 866-1020 | 1020-1188 | 1188-1370 | 1370-1560 | 1560-1779 | 1779-2010 | 2010-2260 | 2260-2530 | 2530-2823 | 2823-3141 | 3141-3484 | 3484-3856 | 3856-4259 | Name | K |
| τ | | | | | | | | | | | | | | | | | | | | | | |
| 1 | 11 | 15 | 20 | 33 | 48 | 29 | 41 | 17 | 34 | 46 | 72 | 30 | 13 | 57 | 62 | 83 | 40 | 21 | 18 | 92 | C | 3 |
| 2 | 11 | 15 | 20 | 33 | 48 | 29 | 41 | 17 | 34 | 44 | 72 | 30 | 13 | 57 | 62 | 83 | 40 | 21 | 18 | 90 | | |
| 3 | 11 | 15 | 20 | 33 | 48 | 29 | 41 | 17 | 34 | 46 | 72 | 30 | 13 | 57 | 60 | 83 | 40 | 21 | 18 | 92 | | |
| 4 | 11 | 15 | 20 | 33 | 48 | 29 | 41 | 17 | 34 | 46 | 72 | 30 | 13 | 57 | 62 | 83 | 40 | 21 | 18 | 92 | | |
| 5 | 12 | 16 | 21 | 30 | 20 | 27 | 39 | 20 | 40 | 25 | 55 | 35 | 25 | 56 | 48 | 71 | 33 | 19 | 16 | 70 | | |
| 6 | 14 | 18 | 23 | 26 | 15 | 20 | 36 | 35 | 50 | 18 | 40 | 40 | 38 | 55 | 36 | 50 | 29 | 17 | 13 | 62 | | |
| 7 | 16 | 19 | 24 | 18 | 10 | 16 | 33 | 40 | 55 | 16 | 15 | 45 | 52 | 52 | 24 | 32 | 24 | 16 | 9 | 43 | B | 2 |
| 8 | 18 | 20 | 25 | 15 | 8 | 10 | 30 | 50 | 60 | 15 | 8 | 50 | 60 | 50 | 18 | 20 | 21 | 15 | 8 | 20 | | |
| ⋯ | ⋯ | ⋯ | ⋯ | ⋯ | ⋯ | ⋯ | ⋯ | ⋯ | ⋯ | ⋯ | ⋯ | ⋯ | ⋯ | ⋯ | ⋯ | ⋯ | ⋯ | ⋯ | ⋯ | ⋯ | | |
| 13 | 18 | 20 | 25 | 15 | 8 | 10 | 30 | 50 | 60 | 15 | 8 | 50 | 60 | 50 | 18 | 20 | 21 | 15 | 8 | 20 | | |
| 14 | 19 | 19 | 30 | 15 | 15 | 16 | 22 | 40 | 48 | 10 | 19 | 40 | 48 | 33 | 25 | 38 | 21 | 21 | 10 | 21 | | |
| 15 | 19 | 19 | 43 | 18 | 17 | 18 | 20 | 31 | 30 | 8 | 21 | 25 | 26 | 21 | 47 | 42 | 22 | 28 | 15 | 22 | | |
| 16 | 19 | 18 | 48 | 23 | 28 | 23 | 18 | 19 | 25 | 7 | 23 | 16 | 15 | 20 | 58 | 49 | 23 | 30 | 15 | 23 | A | 1 |
| 17 | 20 | 18 | 50 | 30 | 31 | 25 | 18 | 8 | 20 | 6 | 25 | 7 | 8 | 20 | 60 | 58 | 25 | 35 | 15 | 23 | | |
| 18 | 20 | 18 | 50 | 30 | 31 | 25 | 18 | 8 | 20 | 6 | 25 | 7 | 8 | 20 | 60 | 58 | 25 | 35 | 15 | 23 | | |
| 19 | 20 | 18 | 50 | 30 | 31 | 25 | 18 | 8 | 20 | 6 | 25 | 7 | 8 | 20 | 60 | 58 | 25 | 35 | 15 | 23 | | |
| 20 | 20 | 18 | 50 | 30 | 31 | 25 | 18 | 8 | 20 | 6 | 25 | 7 | 8 | 20 | 60 | 58 | 25 | 35 | 15 | 23 | | |

FIG. 4

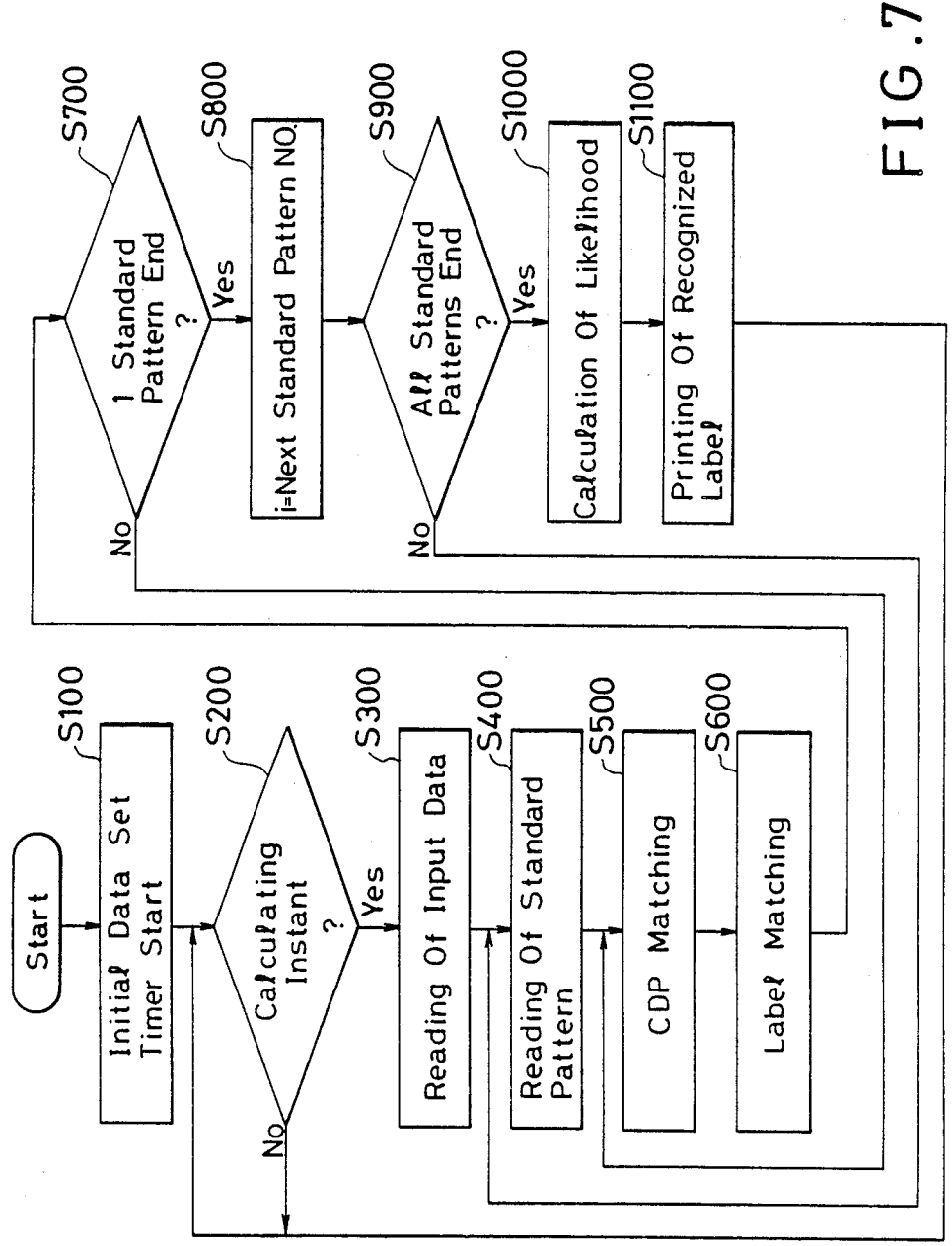

PHONEME LABELLING OF FRAME BY ACCUMULATING EVIDENCE OBTAINED FROM SPOTTING RESULTS OF MICROSCOPIC UNITS

BACKGROUND OF THE INVENTION

1. Field of the Invention

The present invention relates to a phonemic recognition system which automatically recognizes speech generated by human beings and can be used in applications such as expressing the results of that recognition in print, and more particularly to a phonemic recognition system in which a unit of recognition is a phoneme that is smaller than a word.

2. Description of the Prior Art

In a conventional arrangement of this type of phonemic recognition system, wide use has been made of a method in which a standard pattern is composed using a word as a unit of recognition and phonemic recognition is performed by matching input patterns with the standard pattern by using dynamic programming (hereinafter referred to as DP).

In this conventional pattern matching system, the unit adopted as a standard pattern is as large as the size of a word and has conveyed a high rate of recognition when the number of words is lower than about one hundred. However, when the standard pattern is formed in an interval where a recognition unit such as phoneme or phonemic particle is shorter than a word, this pattern matching system has not exhibited sufficient effectiveness. The reasons follow. It is difficult to form a standard pattern of phoneme which is subject to various deformations due to the preceding and subsequent phonemic environment because a pattern length in the standard pattern is short. The standard pattern cannot be matched correctly to the input patterns.

This disadvantage of the prior art will be explained in detail. First, an explanation will be made of continuous DP (CDP) matching to be used to recognize a word in which a plurality of phonemic particles are joined continuously.

When using continuous DP, a strength (spectrum) of each frequency domain in a speech input is given by the following equation.

$$\{f(t,x): 1 \leq t < \infty, 1 \leq x \leq L\} \quad (1)$$

where t indicates an instant (time axis), and the speech input is sampled at each instant $t = 1, 2, 3, \ldots$ A time interval between $t=1$ and $t=2$ is from 8 to 10 msec. The variable x is a frequency axis parameter number indicating a frequency domain. For example, when the spectrum in the frequency domain of the speech input is obtained with passing the speech input through a 20 channel band-pass filter, the channel number of the band-pass filter or the number indicating the frequency domain (the band number) is used as x. Consequently, $f(t,x)$ indicates an output value of the band-pass filter on band x at instant t.

FIG. 1 is a table showing a spectrum $f(t,x)$ for $t=1$ to $t=4$ and band number $x=1$ to 20. In the case of continuous speech, sampling will be made even after instant $t=4$. A standard pattern $Z(\tau,x)$ used for continuous DP is expressed by the following equation.

$$\{Z(\tau,x): 1 \leq \tau \leq T, 1 \leq x \leq L\} \quad (2)$$

The standard pattern $Z(\tau,x)$ shows a result of sampling in advance of the output at each instant from instant 1 to instant T, while a speaker is generating a single word solely, and at each band of the above-mentioned band-pass filter. Here, the time duration $\tau$ is equal to the above-mentioned time duration between two adjacent instants.

FIG. 2 shows an example of a standard pattern for $\tau=20$, $L=20$.

In this case, the distance between the standard pattern and the input pattern is expressed by the following equation using an absolute value distance equation.

$$d(t,\tau) = \frac{1}{L} \sum_{x=1}^{L} |f(t,x) - Z(\tau,x)| \quad (3)$$

Next, using this distance $d(t,\tau)$, the distance at each point from $\tau=1$ to $\tau=T$ is calculated. Applying the DP method, the following asymptotic equation gives the cumulative distance $P(t,\tau)$.

$$
\begin{aligned}
P(t,1) &= 3 \cdot d(t,1)(\tau = 1) & \text{(a)} \\
& \quad P(t-2,1) + 2 \cdot d(t-1,2) + d(t,2) & \text{(b)} \\
P(t,2) &= \min P(t-1,1) + 3 \cdot d(t,2) & \text{(c)} \\
(\tau = 2) & \quad P(t,1) + 3 \cdot d(t,2) & \text{(d)} \\
& \quad P(t-2,\tau-1) + 3 \cdot d(t-1,\tau) + d(t,\tau) & \text{(e)} \\
P(t,\tau) &= \min P(t-1,\tau-1) + 3 \cdot d(t,\tau) & \text{(f)} \\
(3 \leq \tau \leq T) & \quad P(t-1,\tau-2) + 3 \cdot d(t,\tau-1) + 3 \cdot d(t,\tau) & \text{(g)}
\end{aligned}
$$

An initial condition for $P(t,\tau)$ is given as $$P(-1,\tau) = P(0,\tau) = \infty, (1 \leq \tau \leq T)$$

Furthermore, the output value $D(t)$ of the continuous DP is determined as $$D(t) = \frac{P(t,T)}{3T} \quad (5)$$

This value $D(t)$ indicates an optimum distance between an input pattern at an instant t and the standard pattern.

In continuous speech recognition, when only continuous DP is used, it is usual that the local minimum value of $D(t)$ expressed by equation (5) is obtained and a standard pattern giving that minimum value and an instant corresponding thereto is output as a unit of recognition. In this case, a size of the unit of recognition forming the standard pattern in a conventional system has been as large as a word. But, as pointed out above, in order to handle large vocabularies, non-specified speakers and continuous voice recognition systems, it is required that a fundamental unit of recognition be smaller than a word. When it is attempted to distinguish between a phoneme of an input pattern by using the above equations with referring to a standard pattern having a unit smaller than a word, a speech recognition system using conventional DP does not give a high rate of recognition. As explained above, the reason for this is that as the fundamental unit of recognition becomes smaller, a length of the standard pattern expressing that unit becomes shorter and accordingly a phonemic pattern varies greatly depending on preceding and subsequent phonemic patterns, so that it is not possible to determine a standard pattern nor to make an accurate matching. For this reason, there have been doubts about an efficacy of using the conventional method of pattern matching for recognition of a small unit like a phoneme.

However, if a word is used as the unit of recognition, the number of words that must be recognized rises practically to more than one thousand, and thus a very large computer would be needed to perform the calculations of the above equations (1) to (5) and a memory with a large memory capacity would be needed to store the data to be calculated. There is a further problem that a time required for these calculations would be very long. Considering these circumstances, it is clear that a unit of recognition smaller than a word such as phoneme or phonemic particle must be used in structuring a speech recognition system in particular for continuous speech, since there are only several tens of types of phonemes.

SUMMARY OF THE INVENTION

In view of the above, it is an object of the present invention to provide a speech recognition system which can accurately recognize a unit such as phoneme or phonemic particle that is smaller than a word in continuous speech using a DP matching method.

In the first aspect of the present invention, the speech recognition system comprises speech input means for converting a speech input into an electrical signal, analysis means for analyzing an input pattern from an output waveform of said speech input means, memory means for storing in advance a plurality of standard patterns formed by joining a plurality of characteristic parameter series expressing at least a phoneme or a phonemic particle, continuous DP calculating means for calculating a distance between an input pattern analyzed by said analysis means and each of the standard patterns stored in the memory means, and for calculating a matching value between the input pattern and the standard pattern in accordance with a matching system based on continuous dynamic programming, parameter calculating means for calculating a parameter expressing a matching history based on a characteristic parameter series corresponding to a matching pass selected under continuous dynamic programming executed by the continuous DP calculating means, comparison means for comparing a matching value calculated by the continuous DP calculating means with a predetermined threshold value, and recognition means for recognizing that a parameter corresponding to a standard pattern of a matching value calculated by the continuous DP calculating means is a phoneme and/or a phonemic particle corresponding to the input pattern when, as a result of comparison by the comparison means, that matching value is smaller than the predetermined threshold value.

In this first aspect of the present invention, the continuous DP calculating means uses standard patterns formed by joining a plurality of characteristic parameter series that express phonemes or phonemic particles. Matching of speech input patterns are inputted from the speech input means into the analysis means to analyze the input patterns with the standard patterns is performed by the continuous DP calculating means according to a matching system based on continuous dynamic programming. In response to the matching of the input patterns with the standard patterns performed by this matching system based on continuous dynamic programming, a parameter calculating means calculates the parameters expressing the matching history of the phonemes and/or phonemic particles.

The recognition means uses a parameter indicating a matching history of a standard pattern that is within a predetermined threshold value with respect to a continuous DP value as an input pattern recognition parameter at each matching position (actually, at each instant), so that a phoneme in continuous speech can be recognized.

In the second aspect of the present invention, a speech recognition system comprises:

speech input means for converting a speech input into an electrical signal;

analysis means for analyzing an input pattern from an output waveform of said speech input means;

memory means for storing in advance a plurality of standard patterns formed by joining a plurality of characteristic parameter-series expressing at least a phoneme or a phonemic particles;

continuous DP calculating means for calculating a distance between an input pattern analyzed by the analysis means and each of the standard patterns stored in the memory means, and for calculating a matching value between the input pattern and the standard pattern in accordance with a matching system based on continuous dynamic programming;

parameter calculating means for calculating a parameter expressing a matching history based on a characteristic parameter series corresponding to a matching pass selected under continuous dynamic programming executed by the continuous DP calculating means;

comparison means for comparing a matching value calculated by said continuous DP calculating means for each of the standard patterns with a predetermined threshold value;

accumulating means for accumulating for each matching position the number of parameters having the same matching position by using parameters corresponding to the respective standard patterns which are judged to be smaller than the threshold value by the comparison means; and recognition means for determining the phonemes and/or phonemic particles of a parameter for which the number of accumulation by the accumulating means is maximized as recognition phonemes of the input pattern at the matching position.

In this second aspect of the present invention, the continuous DP calculating means uses standard patterns formed by joining a plurality of characteristic parameter series that express phonemes or phonemic particles. Matching of speech input patterns are inputted from the speech input means into the analysis means to analyze the input patterns with the standard patterns is performed by the continuous DP calculating means according to a matching system based on continuous dynamic programming. In response to the matching of the input patterns with the standard patterns performed by this matching system based on continuous dynamic programming, a parameter calculating means calculates the parameters expressing the matching history of the phonemes and/or phonemic particles.

With regard to the continuous DP value, the accumulating means accumulates the number of the plurality of historical parameters of standard patterns that fall within the predetermined threshold value and have the same matching position (actually, the same instant) for each type of historical parameter. The recognition means determines the historical parameter which has the maximum number of accumulated parameters as the phonemic pattern of the input pattern at the matching position, so that phonemes and/or phonemic particles in continuous speech can be recognized with a high accuracy.

The above and other objects, effects, features and advantages of the present invention will become more apparent from the following description of preferred embodiments thereof taken in conjunction with the accompanying drawings.

BRIEF DESCRIPTION OF THE DRAWINGS

FIG. 1 is an explanatory table showing an example of an input speech pattern in the prior art;

FIG. 2 is an explanatory table showing an example of a standard pattern in the prior art;

FIG. 4 is an explanatory table showing an example of a standard pattern according to the present invention;

FIG. 7 is a flowchart showing an example of a primary control sequence executed by the computer 13 in the present invention;

DETAILED DESCRIPTION OF PREFERRED EMBODIMENTS

In the present invention, recognition of phonemic particles in continuous speech using the DP matching system is based on the following experiences, phenomena and principles.

Standard patterns having a recognition unit as large as a word can indicate phonemic variations due to modulation better than a standard pattern having a small recognition unit such as phoneme. This is an advantage of the standard pattern with a larger recognition unit, but the larger the recognition unit, the rougher will be the determination of recognition. This is because when a larger recognition unit is used for pattern matching, only portions which are thought to be partially correctly matched are not picked out. In view of this, by first using continuous DP to perform matching of a standard pattern with input patterns on the basis of a comparatively large recognition unit, then by totaling and judging those results on the basis of a smaller recognition unit, it is possible to keep the advantages of having a larger matching unit, while the disadvantage of not outputting a smaller recognition unit is compensated. In order to realize this feature, a new calculation equation for partial matching as described below is compiled, and a speech recognition system using this equation is arranged to distinguish phonemes in continuous speech.

An explanation will be made with reference to FIG. 3 of an outline of a partial matching system using a continuous DP according to the present invention, using as an example a standard pattern composed of three phonemic particles.

Figure 3:
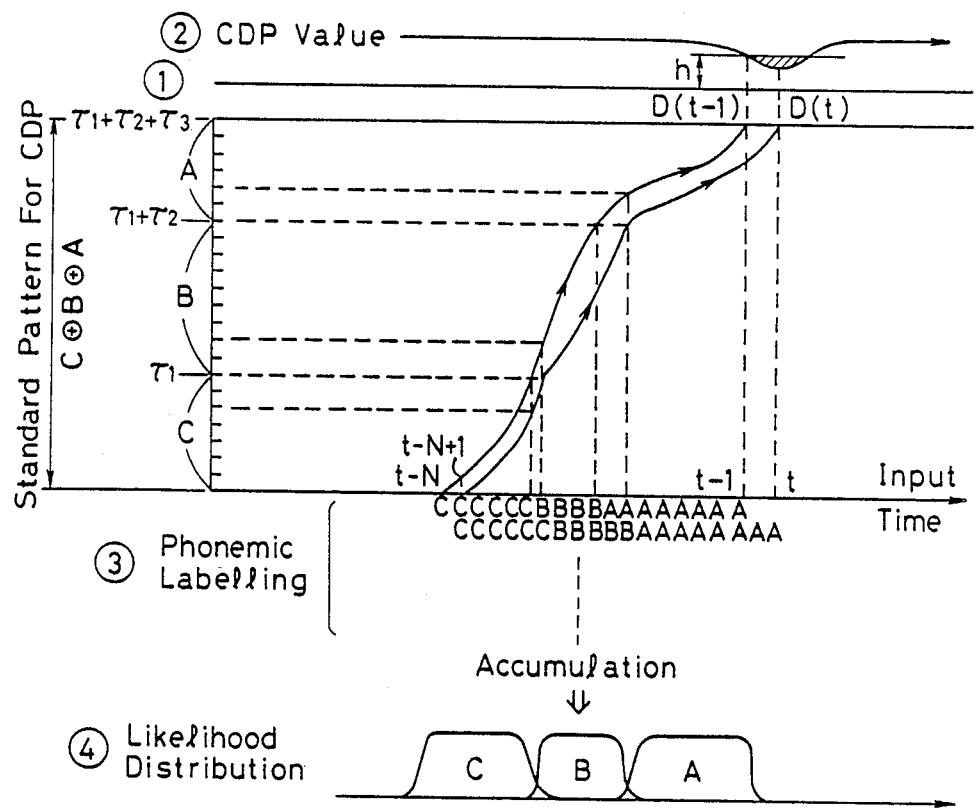
FIG. 3 is an explanatory diagram showing an outline of partial matching of a standard pattern according t the present invention.

In FIG. 3, reference numeral 1 denotes an example of a standard pattern for continuous DP. In a system according to the present invention, a standard pattern is formed by joining a plurality of patterns, each having categories of phonemes (and/or phonemic particles). FIG. 3 shows an example of a standard pattern composed of three phonemic particles A, B and C from continuous speech. As in this example, when a standard pattern for continuous DP $$\{Z(\tau,x): 1 \leq \tau \leq T, 1 \leq x \leq L\}$$

is composed from three phonemic particles, $Z(\tau,x)$ is expressed by the following equation (6);

$$Z(\tau,x) = \begin{cases} z_1(\tau,x) & 1 \leq \tau \leq \tau_1 \\ z_2(\tau - \tau_1, x) & \tau_1 + 1 \leq \tau \leq \tau_1 + \tau_2 \\ z_3(\tau - \tau_1 - \tau_2, x) & \tau_1 + \tau_2 + 1 \leq \tau \leq \tau_1 + \tau_2 + \tau_3 \end{cases} \quad (6)$$

where $$\{z_i(\tau,x): 1 \leq \tau \leq \tau_1, 1 \leq x \leq L\} \, i = 1, 2, 3 \quad (7)$$

show patterns of the respective phonemic particles.

Further, the standard pattern expressed by equation (b 6) is not made by linking standard patterns of phonemes and/or phonemic particles made individually. The standard pattern in continuous DP is obtained by sampling patterns of macroscopic categories made by linking microscopic categories of phonemes and/or phonemic particles in a word as a sample of a macroscopic unit. The dividing points $(\tau_1, \tau_2, \tau_3, \ldots)$ are specified by these sampled categories of phonemes and/or phonemic particles, and these samples of macroscopic unit are averaged to make the standard pattern. In this way, the standard pattern of phonemes and/or phonemic particles is expressed in such a way that the standard pattern exists in the macroscopic standard pattern in equation (6).

Next, an explanation will be made of the parameters of the matching history when the input patterns are matched with the standard pattern made from phonemes and/or phonemic particles in continuous speech and made as described above by continuous DP. The matching history parameter is a parameter indicating to which phonemes (and/or phonemic particles) in the standard pattern the input pattern corresponds at each frame instant. Even if a standard pattern for continuous DP has a large unit, the matching history parameters make it possible to judge matching conditions with a smaller unit. The parameters expressing the matching histories are determined by the following equation.

When $\sigma(\tau)$ indicates a phoneme (and/or phonemic particle) category number, for instance, category number "1" is allotted to phoneme A, "2" to phoneme B and "3" to phoneme C, then $$\sigma(\tau) = k \text{ if } \{Z(\tau,x): 1 \leq x \leq L\} \epsilon S_k \quad (8)$$

, where $Z(\tau,x)$ is a portion of a standard pattern (macroscopic category) used in continuous DP and $S_k$ is the pattern (microscopic pattern) of the k-th phoneme (and/or phonemic particle).

FIG. 4 is an example of a standard pattern. This standard pattern consists of the phonemes C, B and A and is the result of spectrum analysis of the standard pattern at each instant from $\tau=1$ to $\tau=20$. The period from $\tau=1$ to $\tau=6$ is $\tau 1$, from $\tau=7$ to $\tau=15$ is $\tau 2$, and from $\tau=16$ to $\tau=20$ is $\tau 3$. During the period $\tau 1$, phoneme C is being generated, during the period $\tau 2$ phoneme B, and during the period $\tau 3$ phoneme A. Here, phoneme C is set as number 3, phoneme B as number "2" and phoneme A as number "1". In equation (8), therefore, at instant t, it is deemed that;

$$\begin{aligned} \sigma(1) &= \sigma(2) = \ldots \sigma(6) = 3 \\ \sigma(7) &= \sigma(8) = \ldots \sigma(15) = 2 \\ \sigma(15) &= \sigma(16) = \ldots \sigma(20) = 1. \end{aligned} \quad (9)$$

Here, the parameters $E(t,\tau,\alpha)$ expressing the matching history according to continuous DP are expressed below in recurrence formulae corresponding to equations (a) to (g) in (4) of continuous DP expressed in the prior art.

(a)
$$\begin{cases} E(t,1,1) = K \quad \{Z(1,x): 1 \leq x \leq L\} \in S_K \text{ if} \\ (\tau = 1) \\ E(t,1,\alpha) = 0 \quad 2 \leq \alpha \leq N \end{cases}$$

(b)
$$\begin{cases} E(t,2,1) = E(t,2,2) = \sigma(2) \quad (\alpha = 1 \text{ or } \alpha = 2) \text{ if} \\ E(t,2,\alpha) = E(t - 2, 1, \alpha - 2) \quad (3 \leq \alpha \leq N) \end{cases}$$

(c)
$$\begin{cases} E(t,2,1) = \sigma(2) \quad (\alpha = 1), (\tau = 2) \text{ if} \\ E(t,2,\alpha) = E(t - 1, 1, \alpha - 1) \quad (2 \leq \alpha \leq N) \\ \quad (t = 2) \end{cases}$$

(d)
$$E(t,2,\alpha) = E(t,1,\alpha) \quad (1 \leq \alpha \leq N) \text{ if} \quad (\tau = 2)$$

(e)
$$\begin{cases} E(t,\tau,1) = E(t,\tau,2) = \sigma(\tau) \\ \quad (\alpha = 1 \text{ or } \alpha = 2)(3 \leq \tau \leq T) \\ E(t,\tau,\alpha) = E(t - 2, \tau - 1, \alpha - 2) \quad (3 \leq \alpha \leq N) \text{ if} \\ \quad (3 \leq \tau \leq T) \end{cases}$$

(f)
$$\begin{cases} E(t,\tau,1) = \sigma(\tau) (\alpha = 1)(3 \leq \tau \leq T) \text{ if} \\ E(t,\tau,\alpha) = E(t - 1, \tau - 1, \alpha - 1)(2 \leq \alpha \leq N)(3 \leq \tau \leq T) \end{cases}$$

(10)

$$\begin{cases} E(t,\tau,1) = \sigma(\tau) (\alpha = 1) \\ \quad (3 \leq \tau \leq T) \text{ if} \\ E(t,\tau,\alpha) = E(t - 1, \tau - 2, \alpha - 1)(2 \leq \alpha \leq N) \\ \quad (3 \leq \tau \leq T) \end{cases}$$

where an initial condition of the matching history parameter $E(t,\tau,\alpha)$ is;

$$E(-1,\tau,\alpha) = E(0,\tau,\alpha) = 0$$

$$(1 \leq \tau \leq T),(1 \leq \alpha \leq N).$$

Here, $E(t,\tau,\alpha)$ shows the matching history parameter at an instant which is $\alpha$ instants beforehand from an instant t as a frame of reference when calculating the matching of the input pattern with the standard pattern at instant t. Consequently, $\alpha=1$ corresponds to instant t, and $\alpha=m$ corresponds to instant $t-m+1$. Furthermore, $E(t,\tau,\alpha)$ obtained from equation (10) indicates the matching history obtained by matching with input patterns inputted before instant t at time t and parameter $\tau$.

If the total number of standard patterns to be matched with an input pattern for continuous DP is M, then the output of continuous DP from the continuous DP portion 3 is:

$$\{Di(t): i = 1, 2, \ldots, M\} \quad (11)$$

and the matching history parameter is:

$$\{Ei(t,\tau,\alpha): 1 \leq \tau \leq T_i, 1 \leq \alpha \leq N, i = 1, 2, \ldots, M\} \quad (12)$$

Here, it is assumed that a likelihood value (for recognition shown by each phoneme (and/or phonemic particle) category, as illustrated as a likelihood distribution 4 in FIG. 3 is $G(t,\alpha,k)$. Further, k denotes the number of the phoneme (and/or phonemic particle) category, and $G(t,\alpha,k)$ is determined by the following equation;

$$\begin{aligned} G(t,1,k) &= \sum_{i=1}^{M} Ii(t) \cdot \delta(k - Ei(t,Ti,1)) \\ G(t,2,k) &= G(t - 1,1,k) + \sum_{i=1}^{M} Ii(t) \cdot \delta(k - Ei(t,Ti,2)) \\ &\vdots \\ G(t,\alpha,k) &= G(t - 1, \alpha - 1, k) + \sum_{i=1}^{M} Ii(t) \cdot \delta(k - Ei(t,Ti,\alpha)) \\ &\vdots \\ G(t,N,k) &= G(t - 1, N - 1, k) + \sum_{i=1}^{M} Ii(t) \cdot \delta(k - Ei(t,Ti,N)) \end{aligned} \quad (13)$$

where $$Ii(t) = \begin{cases} 1 : Di(t) \leq h \\ 0 : \text{otherwise} \end{cases} \quad (14)$$

$$\delta(x) = \begin{cases} 1 : x = 0 \\ 0 : x \neq 0. \end{cases}$$

The above equations (13) mean that the results of matching history for each frame are accumulated separately for each phoneme category. The likelihood value $G(t,\alpha,k)$ is defined by the number of accumulations in each of those categories. The likelihood value at instant t is determined by the history parameter from instant t to instant $t+N-1$. Here, N expresses an amount of delay and is a number corresponding at least to twice the largest standard pattern used in continuous DP, and normally N is about 80. Furthermore, the threshold value h is determined experimentally and is in the same category as the standard pattern. The threshold value h should be set at about 35% larger than the continuous DP value obtained at an instant in the vicinity of the trailing edge of an input when a different pattern is inputted.

From the above definitions, when frame characteristics of an input speech at instant $t-N+1$ are recognized by phoneme (and/or phonemic particle) category, the first candidate is given by $$k_1^*(t-N+1) = Arg\left\{\max_k G(t,N,k)\right\} \quad (15)$$

$$k_2^*(t-N+i) = Arg\left\{\max_{k \neq k_1^*} G(t,N,k)\right\} \quad (16)$$

$$k_j^*(t-N+1) = Arg\left\{\max_{k \neq k_1^*, k_2^*, \ldots k_{j-1}^*} G(t,N,k)\right\} \quad (17)$$

Figure 5A:
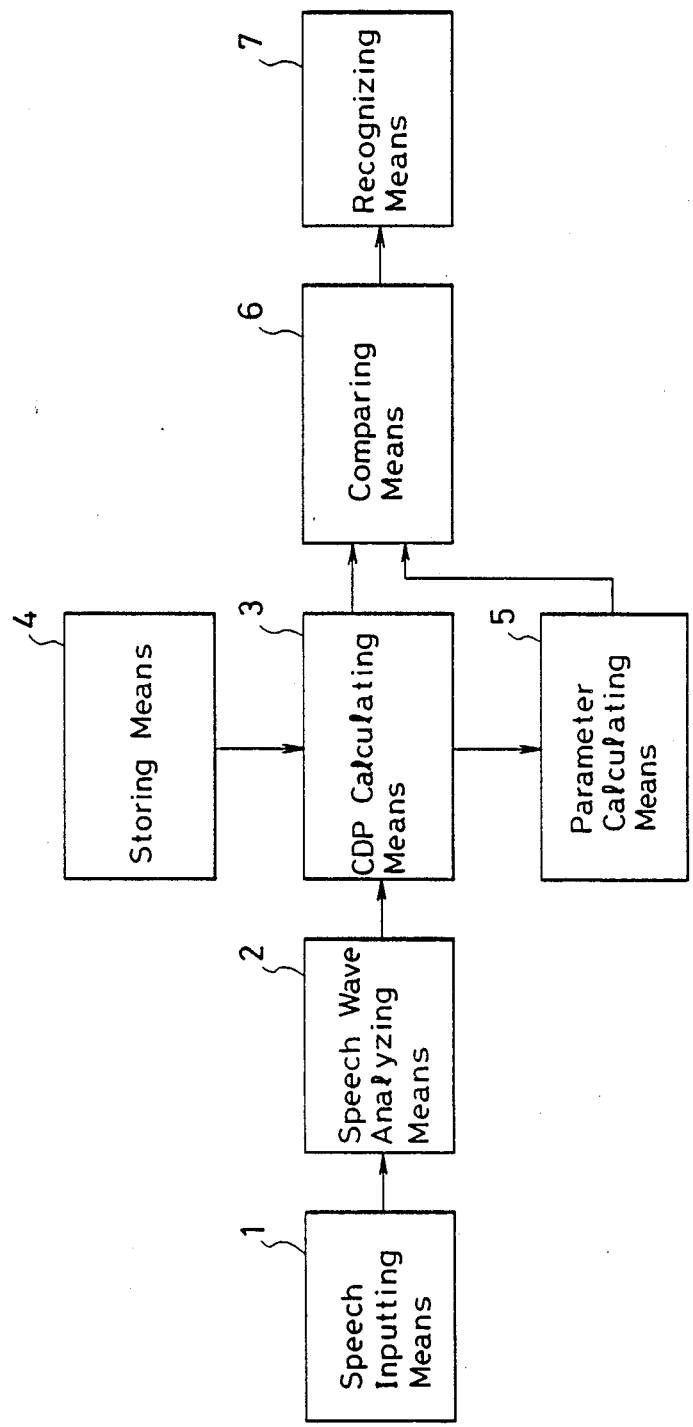
FIG. 5A is a block diagram showing an embodiment of a fundamental arrangement in the first aspect of the present invention.

FIG. 5A shows an outline of an arrangement of an embodiment of the first aspect of the present invention. In FIG. 5A, when speech to be recognized is inputted to input means 1 for inputting speech, the speech input means 1 outputs an analog electrical signal for the speech and supplies the signal to speech wave analysis means 2. The speech wave analysis means 2 analyzes strength (spectrum) for each bandwidth of the speech wave frequency with respect to the analog speech signal to obtain an analysis result in the form of a digital signal. The analysis result in each frequency band analyzed by the speech wave analysis means 2 is transmitted in the form of a digital signal to CDP calculation means 3. Memory means 4 for storing standard patterns stores a plurality of standard patterns picked up in advance from the continuous speech. If the vowel picked up in advance is c and the consonant picked up is v, then the standard patterns consist of three phonemes such as "vcv" or "cvc". Further, it is preferable that the number of phonemes forming the standard pattern be between two and four. These standard patterns are formed as follows. First, speech is inputted into the speech input means 1 by a plurality of specified speakers, so that their characteristics (spectrums) are analyzed in the speech analysis means 2 and then stored in the memory means 4 as standard patterns.

The input speech pattern to be recognized is sent to the continuous DP calculation means 3. The input speech pattern is matched with each of the standard patterns stored in the memory means 4 for storing standard patterns 4 by the continuous DP calculation means 3. In the process of this matching, a phoneme label indicating the matching history is extracted by parameter calculation means 5. When the continuous DP value calculated by the continuous DP calculation means 3 is judged to be smaller than the threshold value predetermined by comparison means 6, the history parameter corresponding to the continuous DP value is recognized by recognition means 7 as a phoneme in each of the matching positions of the input pattern.

Figure 5B:
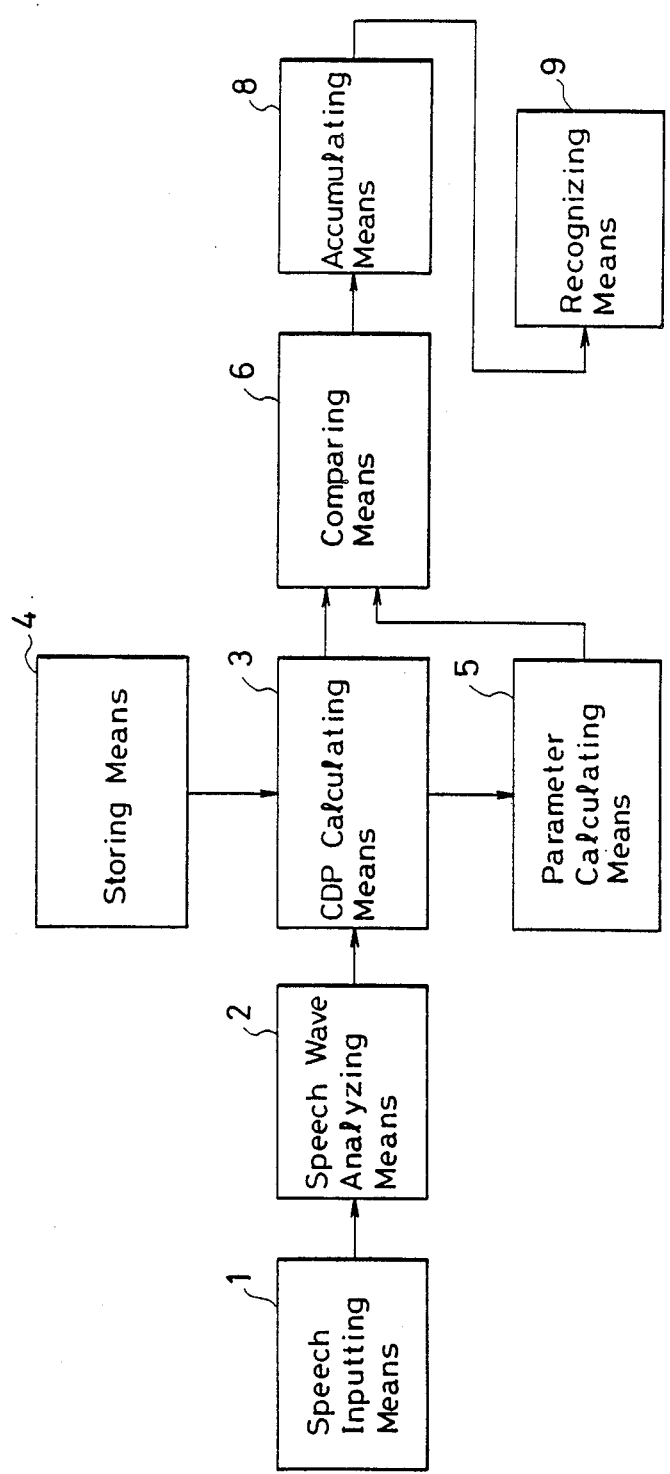
FIG. 5B is a block diagram showing an embodiment of a fundamental arrangement in the second aspect of the present invention.
Figure 6:
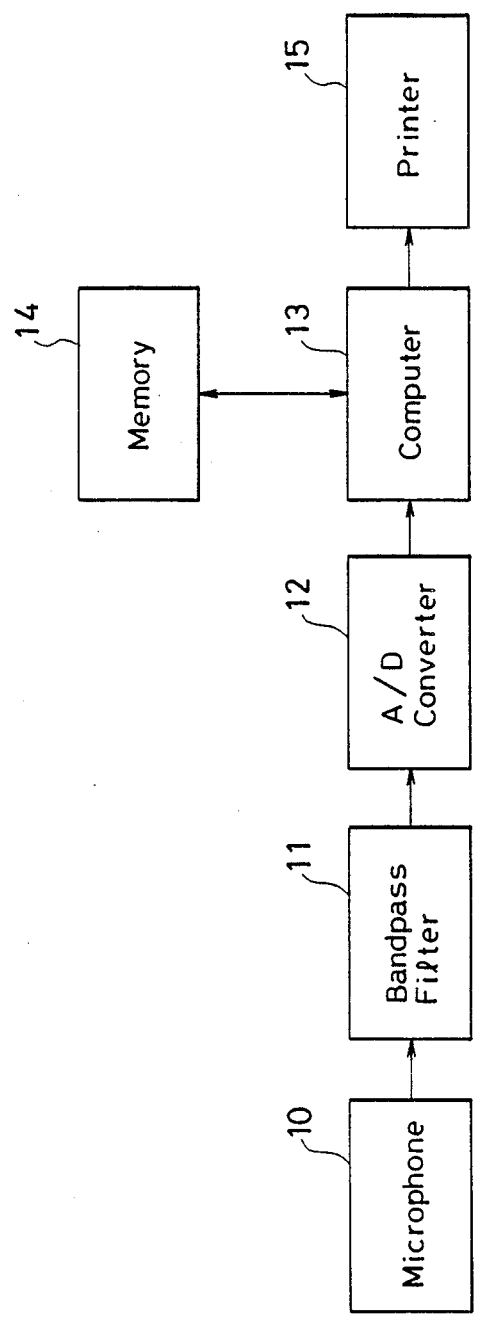
FIG. 6 is a block diagram showing an embodiment of a specific arrangement of a phonemic recognition apparatus in accordance with the present invention.

FIG. 5B shows an outline of an embodiment of an arrangement in the second aspect of the present invention. In this second aspect of the present invention, a plurality of standard patterns which coincide with the input pattern are obtained from the comparison means 6, as in the embodiment shown in FIG. 5A, when a plurality of the standard patterns occur which are smaller than the threshold value. Under this condition, among the history parameters having the same matching position, the history parameters having a larger number are accumulated for each matching position by accumulation means 8 by using parameters corresponding to the respective standard patterns judged to be smaller than the threshold value. Recognition means 9 determines the maximum number of accumulated parameters as the phoneme in each matching position of the input pattern. In other words, the recognition means 9 recognizes the phoneme corresponding to that history parameter as the phoneme for the input pattern.

Next, an explanation will be made of a specific embodiment of a phonemic recognition system in accordance with the present invention.

A microphone 10 is used as the speech input means 1. A band-pass filter 11 and an analog/digital (A/D) convertor 12 are used as the speech wave analysis means 2. The band-pass filter 11 has, for example, 20 channels in accordance with frequencies from 0 to approximately 4,000 Hz. The A/D convertor 12 converts an analog output from each band of the band-pass filter 11 into a digital signal and then transmits the digital signal to a computer 13.

Further, the speech analysis means 2 can be so arranged that after the output from the microphone 10 is converted into the digital signal, a Fourier conversion of the digital signal is performed by a Fourier convertor to obtain a spectrum in each frequency region. The computer 13 includes the continuous DP calculating means 3, the parameter calculation means 5, the comparison means 6, the recognition means 7 or 9, the accumulation means 8 and the memory means 4. The functions of these means are realized by the computer 13 which performs the control sequence shown in FIGS. 7–11. Then, the computer 13 outputs the recognized phoneme to a printer 15 which outputs the recognized phoneme in a visible manner. It is acceptable that the computer 13 executes a predetermined control sequence to output a result of the execution, and it is preferable that the processing described below be completed within a speech sampling time.

The standard patterns consisting of the three phonemes are stored in advance in the memory 14. The memory 14 may either be read-only memory (ROM) or random access memory (RAM). Even if a processing speed of the computer 13 is slower, a recording apparatus using a recording medium such as a floppy disc or a magnetic disc can also be used, when it is desired to store a number of standard patterns. Furthermore, depending on the type of the computer 13, it might already have an internal RAM, in which case that RAM can be used as the recording apparatus. As an example of this type of computer, a model FACOM-380 or IBM-380 can be used.

The required storage capacity of the memory 14 is determined principally by the number of standard patterns and the number of phonemes forming the standard pattern. For example, for each sampling of speech, if the input pattern is inputted to the band-pass filter with 20 bands, and in case that the standard pattern has three phonemic particles, the number of bands is 20 and each standard pattern has a length of 20, the memory 14 must have a capacity of approximately 2000 kbit to hold approximately 400 standard patterns. Furthermore, there will be needed a working memory area of approximately 300 kbit for storing variables to be used in calculating continuous DP. There will be needed a working memory area of approximately 200 kbits for extracting phonemes by partial matching.

Next, an explanation will be made of operations of the present embodiment with reference to the flowcharts shown in FIGS. 7 to 11.

FIG. 7 shows an example of a main flow of instructions to be executed by the computer 13. Before a phoneme to be recognized is inputted, an initial setting is made of various counters and registers in the computer 13. Next, a timer, which is a soft timer or hard timer to be incorporated in the computer 13, for counting the instant t is started. This counter can either count the clock pulses of the computer 13, or can input into the computer 13 the date of instants measured by an externally disposed timer (step S100).

Next, when the computer 13 judges that instant $t=1$ has been reached at step S200, the computer 13 reads in the outputs f(1,1) to f(1,20) of each band in the A/D convertor 12 to store the outputs in each register (step S300). Next, a standard pattern No. 1 is read out from the memory 14 and stored in each register (step S400).

Then, sequential steps S500–S700 are repeatedly performed. That is, continuous DP matching in standard pattern No. 1 (step S500) and matching of the phoneme labels (step S600) are repeatedly performed until, it is judged at step S700 that matching processing of the standard pattern No. 1 is completed. A detailed explanation of this continuous DP matching and the phoneme label matching will be made later.

When the matching processing of the standard pattern No. 1 is completed (step S700), the computer 13 then reads the next standard pattern No. 2 from the memory 14 at step S800 the sequence returns to step S400 via step S900 to perform matching of this standard pattern No. 2 with the input speech pattern by repeating steps S400, S500 and S600. In this manner, the computer 13 sequentially performs matching processing of the M standard patterns stored in the memory 14 with the input pattern. When matching with all the standard patterns is completed (step S900), the likelihood values of the phoneme labels of each of the standard patterns which matches the input pattern are calculated at step S1000, and then the phoneme labels of the input pattern with a high likelihood value are printed at step S1100.

Then, the sequence returns to step S200 to wait for the next instant $t=2$, and at $t=2$ the next speech input is analyzed at steps S300–S600.

Figure 8A:
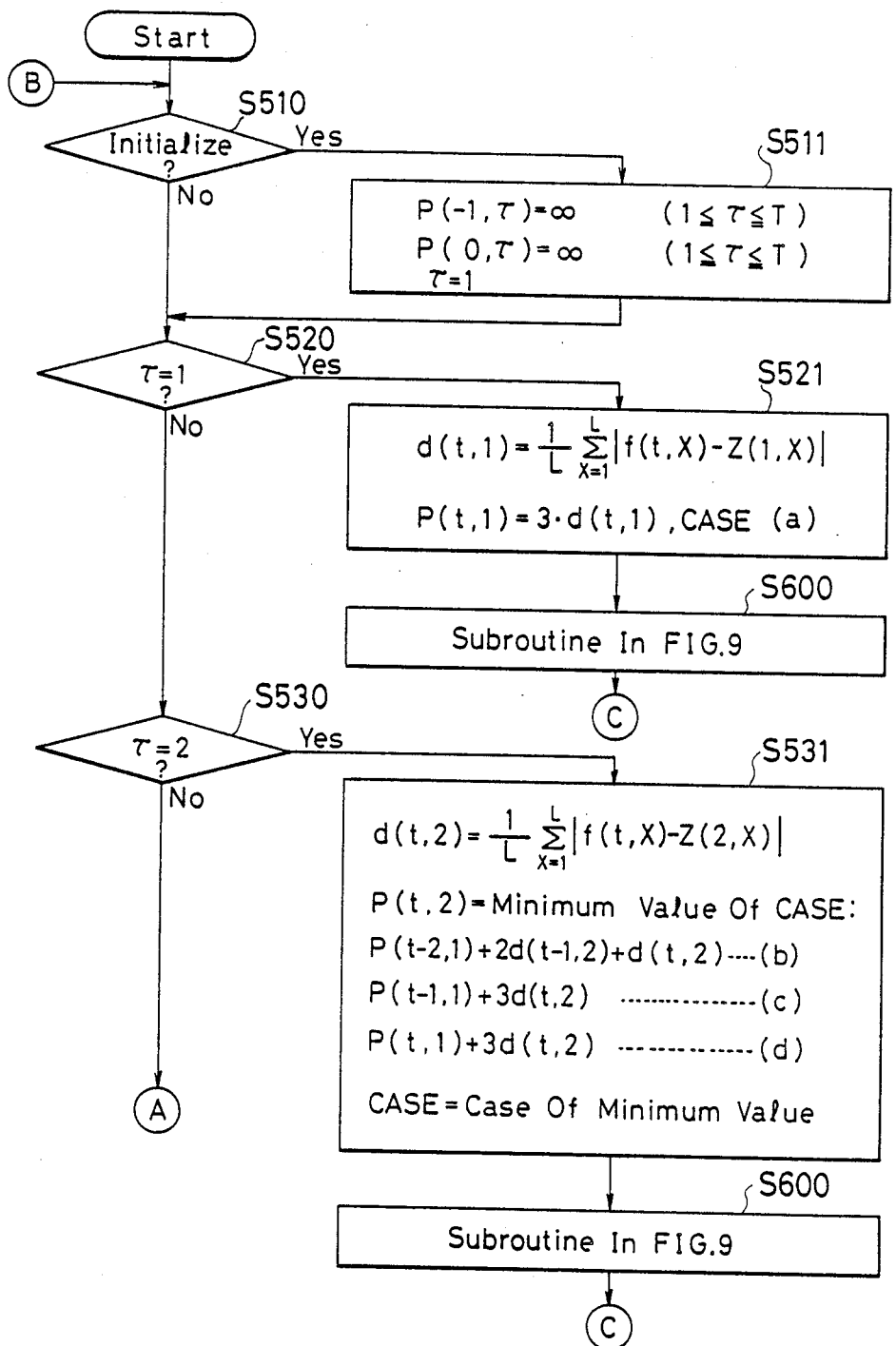
FIGS. 8A and 8B are flowcharts showing an example of a calculation sequence of the continuous DP matching in the flowchart shown in FIG. 7.
Figure 8B:
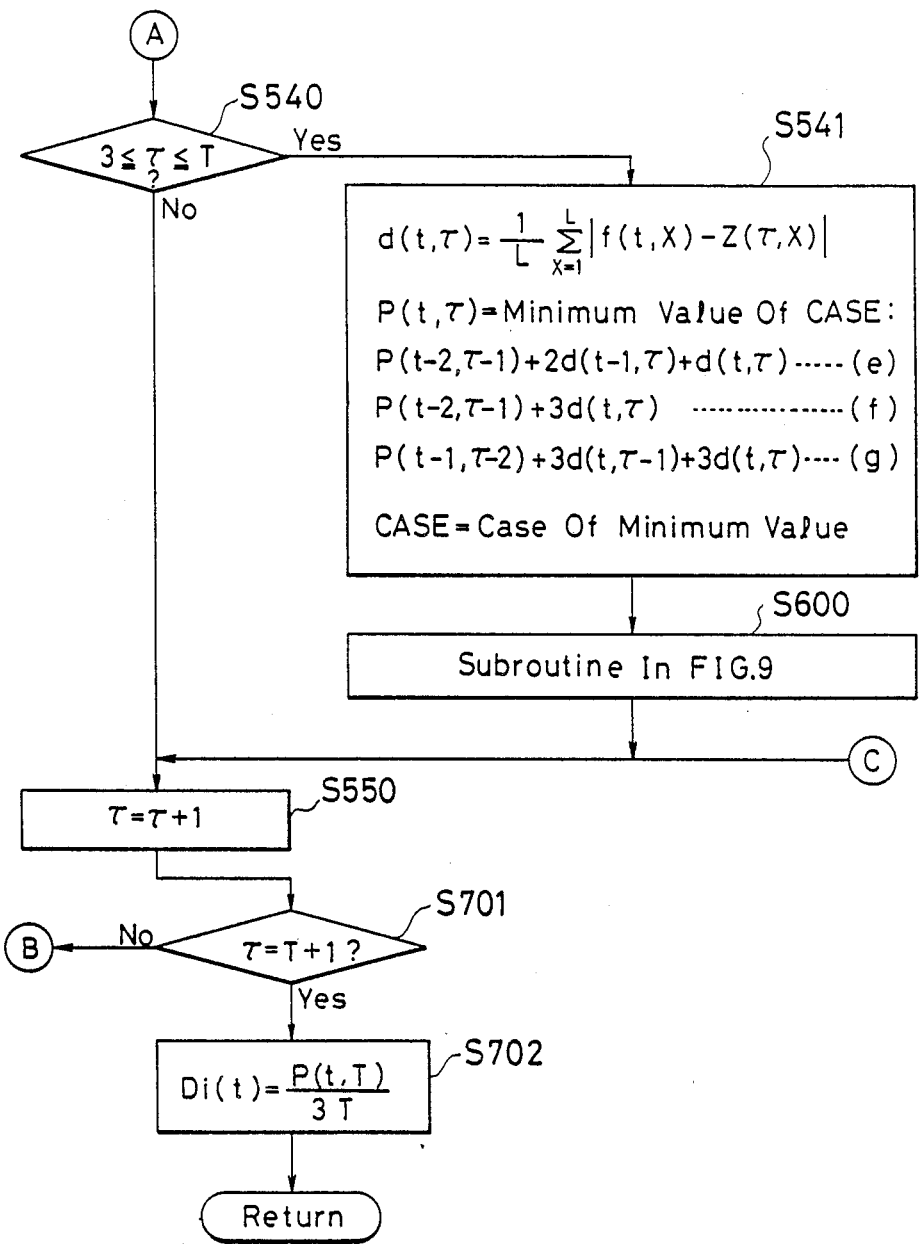

Next, an explanation will be made of a calculating sequence in case that an input pattern shown in FIG. 1 and a standard pattern shown in FIG. 4 are used. In FIGS. 8A and 8B, at $t=1$ an input pattern is sampled and when the computer 13 receives that data, an initial value of the accumulated value is set in step S511. Next, a setting is made of $\tau=1$ and the sequence advances to step S520. Now, $\tau=1$, and accordingly the calculation at step S521 is performed. Here, the results $d(1,1)=0$, $P(1,1)=0$ are obtained. Further, equation (4)(a) of the above-mentioned recurrence formulae is used, so that when case=(a), the sequence advances to the routine shown in FIG. 9.

Figure 9:
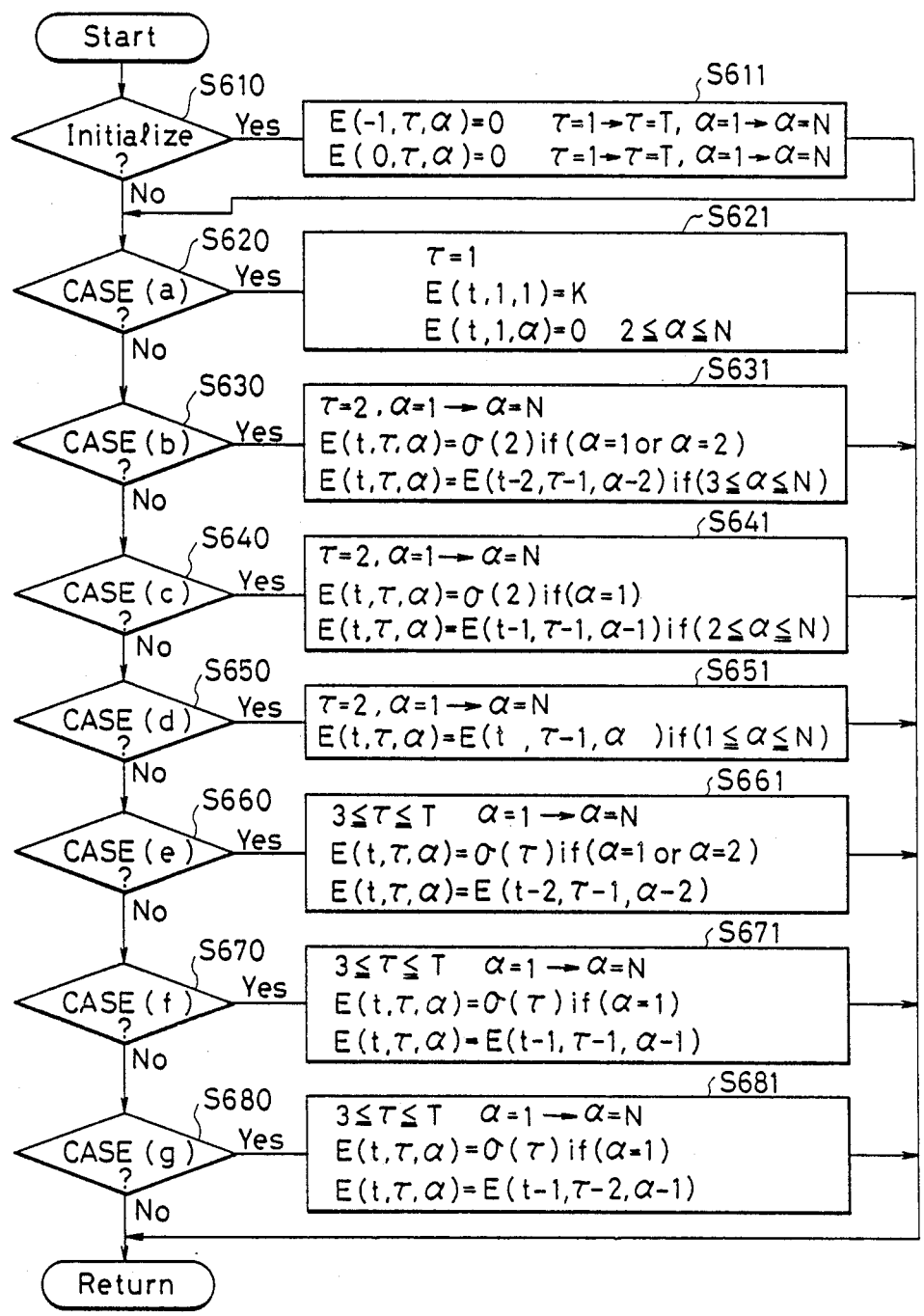
FIG. 9 is a flowchart showing an example of a matching sequence of phoneme labelling in the flowchart shown in FIG. 7.
Figure 10:
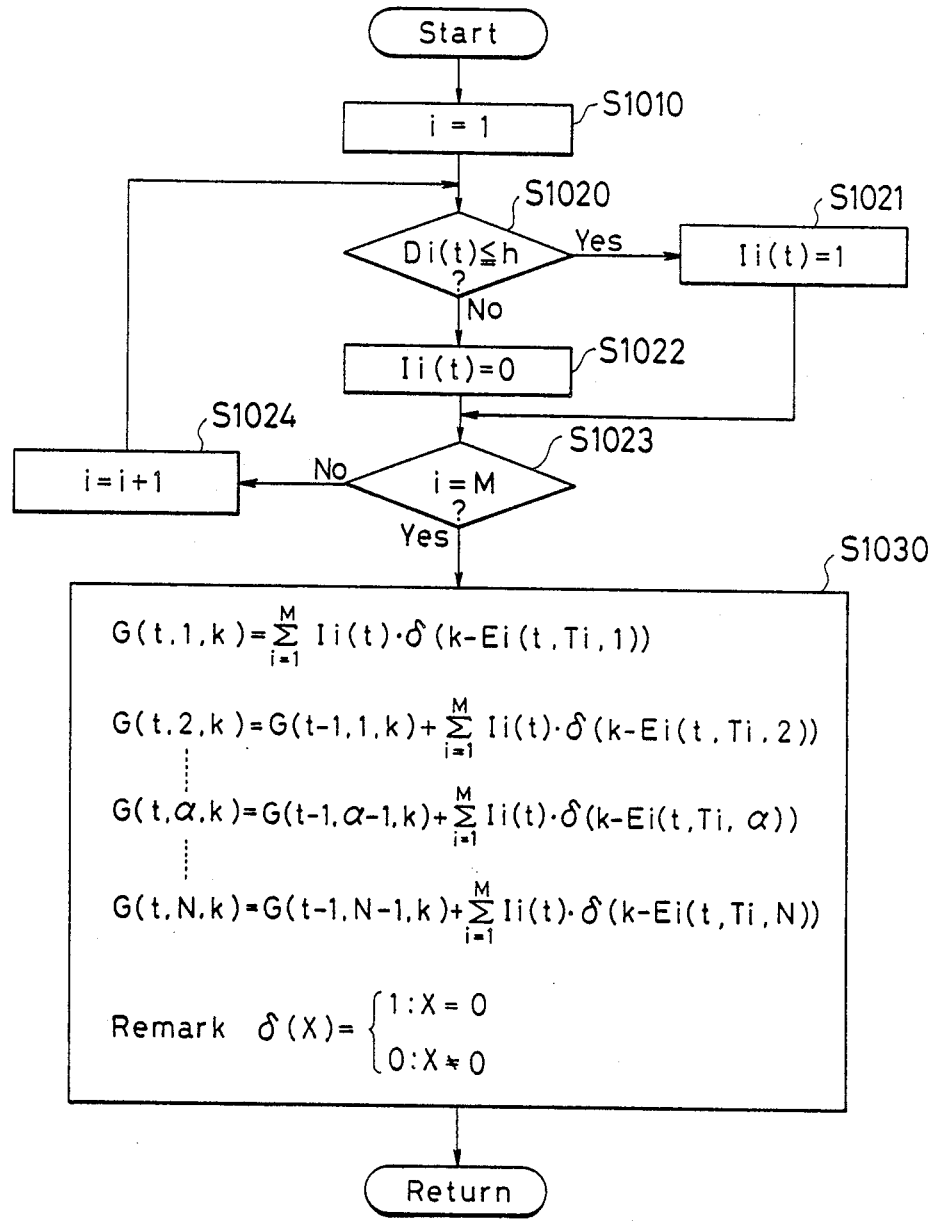
FIG. 10 is a flowchart showing an example of an accumulating sequence for a phoneme category in the flowchart shown in FIG. 7.
Figure 11:
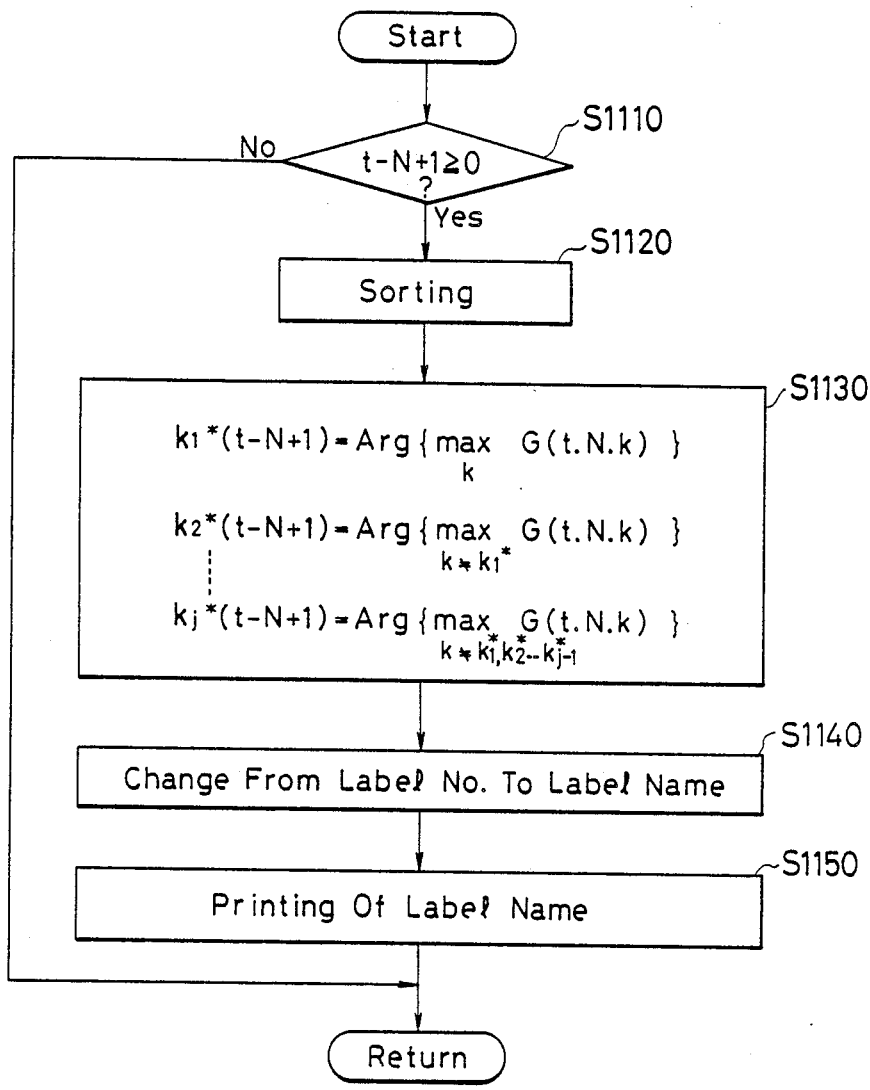
FIG. 11 is a flowchart showing an example of a phoneme recognition sequence in the flowchart shown in FIG. 7.

At step S620 in FIG. 9, case (a) is detected and $E(1,1,1)=3$, $E(1,1,2)=0$ to $E(1,1,10)=0$ are determined in case of $N=10$. Then, in the sequence of steps S621→S550→S701→S510→S530→S531, the accumulated value when $t=1$ and $\tau=2$ is calculated. Here, $d(1,2)=4/20=0.2$ is obtained.

Further, $$P(-1,1)+2d(0,2)+d(1,2)=\infty$$

$$P(0,1)+3d(1,2)=\infty$$

$$P(1,1)+3d(1,2)=0+3\times 0.2=0.6$$

Accordingly, $P(1,2)=0.2$, giving case (d).

Next, at step S651 in FIG. 9, $$E(1,2,1) = E(1,1,1) = 3$$
$$E(1,2,2) = E(1,1,2) = 0$$
$$\vdots$$
$$E(1,2,10) = E(1,1,10) = 0$$

is obtained. In this manner, the history parameters E(1,20,1) to E(1,20,10) are sequentially calculated until $\tau=T=20$.

In this way, matching of one standard pattern is completed, so that at step S800 (FIG. 7), the next standard parameter is read out, and thereafter the following history parameters Ei(1,20,1) to Ei(1,20,10) (i=1 to i=M) are stored in the memory 14 at each number of the standard pattern. When the matching of all the standard patterns at $t=1$ is completed, the sequence advances from step S1000 (FIG. 7) to step S1010 (FIG. 10), and the likelihood values are calculated.

At step S1010, the standard pattern number $i=1$ is set as the initial value. When the DP output value Di(t) obtained in FIG. 8 is smaller than the predetermined threshold value h, a frequency coefficient $Ii(t)=1$ is set. Further, in the first aspect of the present invention, the history parameters of the standard patterns below the threshold value h are determined as the phoneme of the input pattern. Furthermore, in the second aspect of the present invention, which has a higher phonemic recognition capability than the first aspect of the present invention, the phonemic recognition procedure is as follows. The frequency coefficient is calculated from $i=1$ to $i=M$ (steps S1020 to S1024).

Next, the likelihood values are calculated from phoneme label $K=1$ to MM. In the above example, the label "A" of $t=1$, $k=1$ is obtained by the following equation;

$$G(1,1,1) = \sum_{i=1}^{M} Ii(t) \cdot \delta(k - Ei(1,20,1)).$$

Because each of Ei(1,20,2) to Ei(1,20,MM) is "0", when $t=1$, $\delta(1)=0$ and $G(t,2,K)=0$.

When the above calculations are completed, the label names with the high numbers of accumulation are printed by the printer 151 in the step S1100 (FIG. 7) to S1110 (FIG. 11) (steps S1120–S1130). The output of the label name recognized when $t=1$ is printed out as the recognized label after instant N(10).

Following this procedure, it is possible to recognize the phoneme labels by performing the above sequence at each time of sampling of the input pattern.

In addition to the examples described above, in cases when a longer recognition time is acceptable, the sampling of the continuous speech can be made in advance and stored in the memory 14. Then, the phonemic recognition can be performed at a later time. In such a case, the capacity of the memory 14 in which the input speech patterns are stored is increased. In coordination with the processing speed of the computer 13, the input speech patterns can be read out from the memory 14, so that it is possible to use even a smaller computer such as a medium-sized computer or a personal computer. Furthermore, the DP matching recurrence formulae applied in the present embodiment can be expressed as shown below;

$$P(t,1) = a_4 \cdot 3(t,1) \quad \text{(a)}$$

$$P(t,2) = \min \begin{cases} P(t-2,1) + a_1 \cdot d(t-1,2) + a_2 \cdot d(t,2) & \text{(b)} \\ P(t-1,1) + a_3 \cdot d(t,2) & \text{(c)} \\ P(t,1) + a_3 \cdot d(t,2) & \text{(d)} \end{cases}$$

$$P(t,\tau) = \min \begin{cases} P(t-2,\tau-1) + a_1 \cdot d(t-1,\tau) + a_2 \cdot d(t,\tau) & \text{(e)} \\ P(t-1,\tau-1) + a_3 \cdot d(t,\tau) & \text{(f)} \\ P(t-1,\tau-2) + a_4 \cdot d(t,\tau-1) \cdot a_5 \cdot d(t,\tau) & \text{(g)} \end{cases}$$
$$(3 \leq \tau \leq T)$$

When expressed in this fashion, the values of the relationship $a_0 = a_1 + a_2 = a_3 = a_4 = a_5$ can be applied in these equations In the present example, $a_0 = 3$, $a_1 = 2$ and $a_2 = 1$ were employed.

What is claimed is:

1. A speech recognition system comprising:
   speech input means for converting a speech input into an electrical signal;
   analysis means for analyzing an input pattern of said electrical signal received from said speech input means;
   memory means for storing a plurality of standard patterns, each of which represents a macroscopic unit composed of connected phoneme patterns and wherein each phoneme pattern occupies a plurality of spectrum frames and is formed by a plurality of joined spectrum frame sequences, each said phoneme pattern including at least one of a phoneme and a phonemic particle, and each frame of each said phoneme pattern is labelled by a label expressing a category name of one of a phoneme or phonemic particle;
   continuous dynamic programming calculating means for calculating a distance between said input pattern analyzed by said analysis means and each of said plurality of standard patterns stored in said memory means, and for calculating a plurality of matching values which respectively correspond to each calculated said distance between said input pattern and said plurality of standard patterns based on a matching system which includes continuous dynamic programming;
   parameter calculating means for calculating a parameter expressing a matching history of labels as a function of time between said input pattern and each one of said plurality of standard patterns which correspond to respective ones of said plurality of matching values selected using said continuous dynamic programming executed by said continuous dynamic programming calculating means;
   comparison means for comparing each of said plurality of matching values calculated by said continuous dynamic programming calculating means with a predetermined threshold value and for determining when a given one of said plurality of matching values is smaller than said predetermined threshold value; and
   recognition means for determining which said phoneme pattern, expressing said at least one of a phoneme and a phonemic particle, corresponds to said parameter calculated by said parameter calculating means for said given one of said plurality of matching values, and wherein a label for each input frame is determined by accumulating the number of labels with the same frame time and also with the same name in a plurality of said matching histories of labels.

2. A speech recognition system as claimed in claim 1, wherein said analysis means includes a plurality of band-pass filters, each of which receives said electrical signal from said speech input means to produce an output analysis for each of a corresponding plurality of predetermined frequency domains.

3. A speech recognition system as claimed in claim 1, wherein said analysis means further comprises means for performing a Fourier conversion on said electrical signal from said speech input means for each of a plurality of predetermined frequency domains.

4. A speech recognition system as claimed in claim 1, wherein said memory means contains in storage information representing a plurality of phonemes and phonemic particles which were obtained by said recognition means from continuous speech input.

5. A speech recognition system comprising:
   speech input means for converting a speech input into an electrical signal;
   analysis means for analyzing an input pattern of said electrical signal received from said speech input means;
   memory means for storing a plurality of standard patterns, each of which represents a macroscopic unit composed of connected phoneme patterns and wherein each phoneme pattern occupies a plurality of spectrum frames and is formed by a plurality of joined spectrum frame sequences, each said phoneme pattern including at least one of a phoneme and a phonemic particle, and each frame of each said phoneme pattern is labelled by a label expressing a category name of a phoneme or phonemic particle;
   continuous dynamic programming calculating means for calculating a distance between said input pattern analyzed by said analysis means and each of said plurality of standard patterns stored in said memory means, and for calculating a plurality of matching values which respectively correspond to each calculated said distance between said input pattern and said plurality of standard patterns based on a matching system which includes continuous dynamic programming;
   parameter calculating means for calculating parameters expressing a matching history as a function of time between said input pattern and each one of said plurality of standard patterns which correspond to respective ones of said plurality of matching values selected using said continuous dynamic programming executed by said continuous dynamic programming calculating means; said matching history expressed by said parameter comprising a plurality of frames having a time sequence, and each said frame having a corresponding phoneme label;

comparison means for comparing each of said plurality of matching values calculated by said continuous dynamic programming calculating means with a predetermined threshold value and determining when a given one of said plurality of matching values is smaller than said predetermined threshold value; and accumulating means for accumulating, for each frame of a matching history, the number of corresponding ones of said phoneme patterns, by selecting only those ones of said parameters calculated by said parameter calculating means which correspond to the respective ones of said matching values which are determined by said comparison means to be smaller than said threshold value, the selected said parameters corresponding to respective ones of said standard patterns; and recognition means for determining one of said phoneme labels used for said standard patterns for which the number of occurrences accumulated by said accumulating means is maximum as recognition phonemes of said input pattern at said frame and wherein accumulation is performed by calculating said parameters composed both of parameters made at a current frame and parameters made at past frames including labels with the same frame time.

6. A speech recognition system as claimed in claim 5, wherein said analysis means includes a plurality of band-pass filters, each of which receives said electrical signal from said speech input means to produce an output analysis for each of a corresponding plurality of predetermined frequency domains.

7. A speech recognition system as claimed in claim 5, wherein said analysis means further comprises means for performing a Fourier conversion on said electrical signal from said speech input means for each of a plurality of predetermined frequency domains.

8. A speech recognition system as claimed in claim 5, wherein said memory means contains in storage information representing a plurality of phonemes and phonemic particles which were obtained by said recognition means from continuous speech input.

* * * * *